United States Patent
Zeh et al.

(10) Patent No.: US 12,381,855 B2
(45) Date of Patent: Aug. 5, 2025

(54) KEY INDICATION PROTOCOL

(71) Applicant: Infineon Technologies AG, Neubiberg (DE)

(72) Inventors: Alexander Zeh, Munich (DE); Donjete Elshani Rama, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 254 days.

(21) Appl. No.: 18/065,424

(22) Filed: Dec. 13, 2022

(65) Prior Publication Data
US 2024/0195788 A1     Jun. 13, 2024

(51) Int. Cl.
*H04L 9/08*     (2006.01)
*H04L 9/14*     (2006.01)
*H04L 9/40*     (2022.01)

(52) U.S. Cl.
CPC ........ *H04L 63/0428* (2013.01); *H04L 9/0861* (2013.01); *H04L 9/14* (2013.01)

(58) Field of Classification Search
CPC .............................. H04L 63/16; H04L 63/164
See application file for complete search history.

(56) References Cited

U.S. PATENT DOCUMENTS 11,924,172 B1 * 3/2024 Olofsson ............... H04L 61/256
2018/0295112 A1 10/2018 Coppola et al.
2021/0409383 A1 * 12/2021 Jung .................... H04L 9/0869

FOREIGN PATENT DOCUMENTS

| EP | 4290790 A1 | 12/2023 | |
|---|---|---|---|
| WO | WO-2021028066 A1 * | 2/2021 | ............. H04L 12/40 |
| WO | WO-2021186030 A1 * | 9/2021 | ............. G06F 21/44 |
| WO | 2022178871 A1 | 9/2022 | |

OTHER PUBLICATIONS

"IEEE Standard for Local and Metropolitan Area Networks—Port-Based Network Access Control," IEEE Std 802.1X-2020 (Revision of IEEE Std 802.1X-2010 Incorporating IEEE Std 802.1Xbx-2014 and IEEE Std 802.1Xck-2018), Feb. 2020, pp. 1-289.
M. J. Dworkin, "SP 800-38D. Recommendation for Block Cipher Modes of Operation: Galois/Counter Mode (GCM) and GMAC," National Institute of Standards & Technology, Gaithersburg, MD, United States, Nov. 2007, 39 pages.
R. Beaulieu et al., "Simon and Speck: Block Ciphers for the Internet of Things," National Security Agency, Fort Meade, MD, United States, Jul. 2015, 15 pages.
J. Schaad et al., "Advanced Encryption Standard (AES) Key Wrap Algorithm," Internet Engineering Task Force, Request for Comments RFC 3394, RSA Laboratories, Sep. 2002, 41 pages.
Elshani, D., "CAN XL made secure", Jun. 14, 2022, pp. 164-170, XP093153874.
European Search Report for Application No. EP23211065, mailed on May 3, 2024, 8 pages.

* cited by examiner

*Primary Examiner* — Daniel B Potratz
(74) *Attorney, Agent, or Firm* — Harrity & Harrity, LLP

(57) ABSTRACT

A network node may receive a control plane message. The control plane message may include an indication that the control plane message is a control plane message, an indication that the control plane message is associated with security, an indication of a security key to be associated with a secure zone (SZ) of an in-vehicle communication network, and an indication of a freshness value. The network node may perform a cryptographic operation for a data plane message associated with the SZ using the security key.

25 Claims, 11 Drawing Sheets

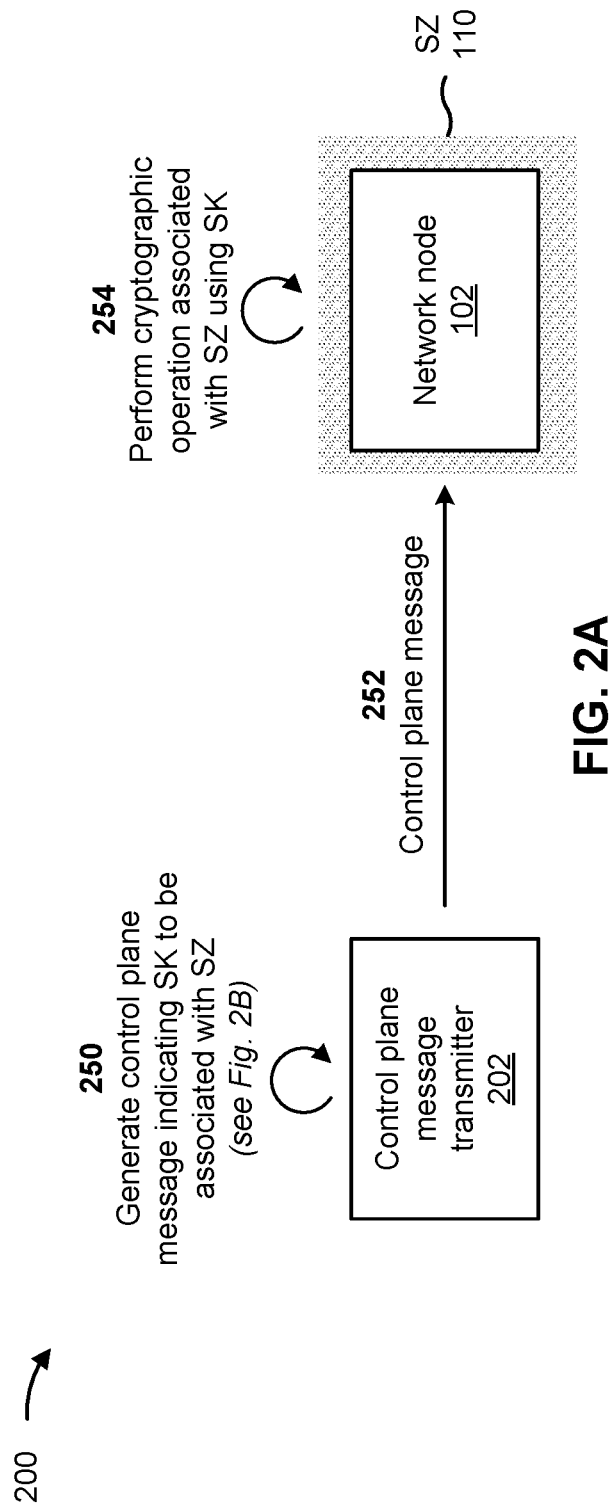
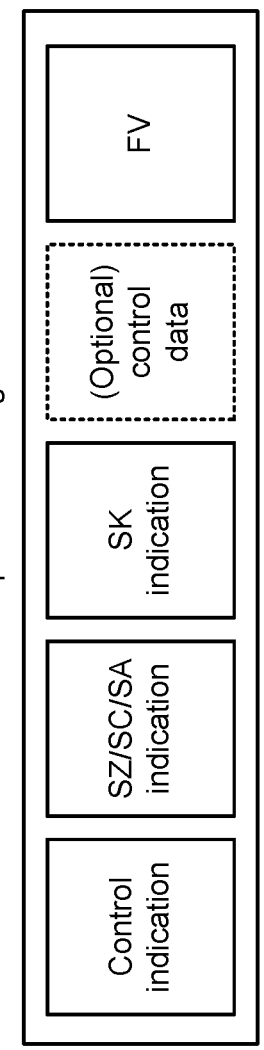
FIG. 2A
FIG. 2B

KEY INDICATION PROTOCOL

BACKGROUND

A bus-based communication system is a system comprising one or more communication buses that interconnect network nodes of a communication network. An individual network node can include, for example, a sensor, an actuator, a controller, and/or another device that is used by the system to perform a function. An in-vehicle communication network may comprise one or more bus-based communication systems. In an in-vehicle communication network, a network node can correspond to a sensor, an actuator, and/or an electronic control unit (ECU) (e.g., an engine control module (ECM), a powertrain control module (PCM), a transmission control module (TCM), a brake control module (BCM), a central control module (CCM), a central timing module (CTM), a general electronic module (GEM), a body control module (BCM), a suspension control module (SCM), and/or the like) that performs operations associated with a function of a vehicle. Network nodes within a bus-based communication system communicate with one another via the communication bus using strings of bits, or frames, that are serially transmitted and/or received according to a message-based communication protocol. One type of protocol used in bus-based systems is a controller area network (CAN) protocol. The CAN protocol can be used for in-vehicle communication networks in vehicles (e.g., road vehicles, off-road vehicles, marine vehicles, aerial vehicles, and/or the like), and can also be used for other applications (e.g., industrial systems, medical systems, robotics systems, and/or the like). The CAN protocol may facilitate safe operation of a vehicle by providing reliable message delivery, non-conflicting messages, and acceptable delivery time, while also being relatively low cost and noise resilient, and supporting redundant routing. Variants of the CAN protocol include CAN extra-long (CAN XL) protocol and CAN flexible data-rate (CAN FD) protocol.

SUMMARY

In some implementations, a network node includes one or more components configured to: receive a control plane message including: an indication that the control plane message is a control plane message, an indication that the control plane message is associated with security, an indication of a security key to be associated with a secure zone (SZ) of an in-vehicle communication network, and an indication of a freshness value; and perform a cryptographic operation for a data plane message associated with the SZ using the security key.

In some implementations, a device includes one or more components configured to: generate a control plane message including: an indication that the control plane message is a control plane message, an indication that the control plane message is associated with security, an indication of a security key to be associated with an SZ of an in-vehicle communication network, and an indication of a freshness value; and transmit the control plane message in association with indicating that a network node is to perform a cryptographic operation for a data plane message associated with the SZ using the security key.

In some implementations, a method includes receiving, by a network node, a control plane message including: an indication that the control plane message is a control plane message, an indication that the control plane message is associated with security, an indication of a security key to be associated with an SZ of an in-vehicle communication network, and an indication of a freshness value; and performing, by the network node and using the security key, a cryptographic operation for a data plane message associated with the SZ.

BRIEF DESCRIPTION OF THE DRAWINGS

FIGS. 2A and 2B are diagrams illustrating examples associated with a key indication protocol for a bus-based communication system.

DETAILED DESCRIPTION

The following detailed description of example implementations refers to the accompanying drawings. The same reference numbers in different drawings may identify the same or similar elements.

As described above, a bus-based communication system may include a network of one or more communication buses that interconnect network nodes of a system (e.g., an in-vehicle system, a vehicle system, an industrial system, a medical system, a robotics system, and/or the like). A network node may include, for example, a sensor, an actuator, a controller, or another device that is used to perform a function of the associated system. In a vehicle, for instance, a network node may correspond to a sensor, an actuator, or an ECU that is associated with a throttle function, a steering function, a braking function, a gear selection function, and/or another function of the vehicle.

In general, a network node of a bus-based communication system may communicate with other network nodes on a communication bus via frames (e.g., strings of bits) that are serially transmitted and/or received according to a message-based communication protocol. For example, a network node may transmit a frame of dominant and/or recessive bits that can be interpreted by another network node as information provided via a sensor, information for controlling an actuator, an operating parameter, or an operating condition, among other examples.

As described above, a bus-based communication system may include a network of one or more communication buses that interconnect network nodes of a communication network (e.g., an in-vehicle system, a vehicle system, an industrial system, a medical system, a robotics system, and/or the like). A network node may include, for example, a sensor, an actuator, a controller, or another device that is used to perform a function of the associated system. In a vehicle, for instance, a network node may correspond to a sensor, an actuator, or an ECU that is associated with a throttle function, a steering function, a braking function, a gear selection function, and/or another function of the vehicle.

In general, a network node of a bus-based communication system may communicate with other network nodes on a communication bus via frames (e.g., strings of bits) that are serially transmitted and/or received according to a message-based communication protocol. For example, a network node may transmit a frame of dominant and/or recessive bits that can be interpreted by another network node as information provided via a sensor, information for controlling an actuator, an operating parameter, or an operating condition, among other examples.

Figure 1A:
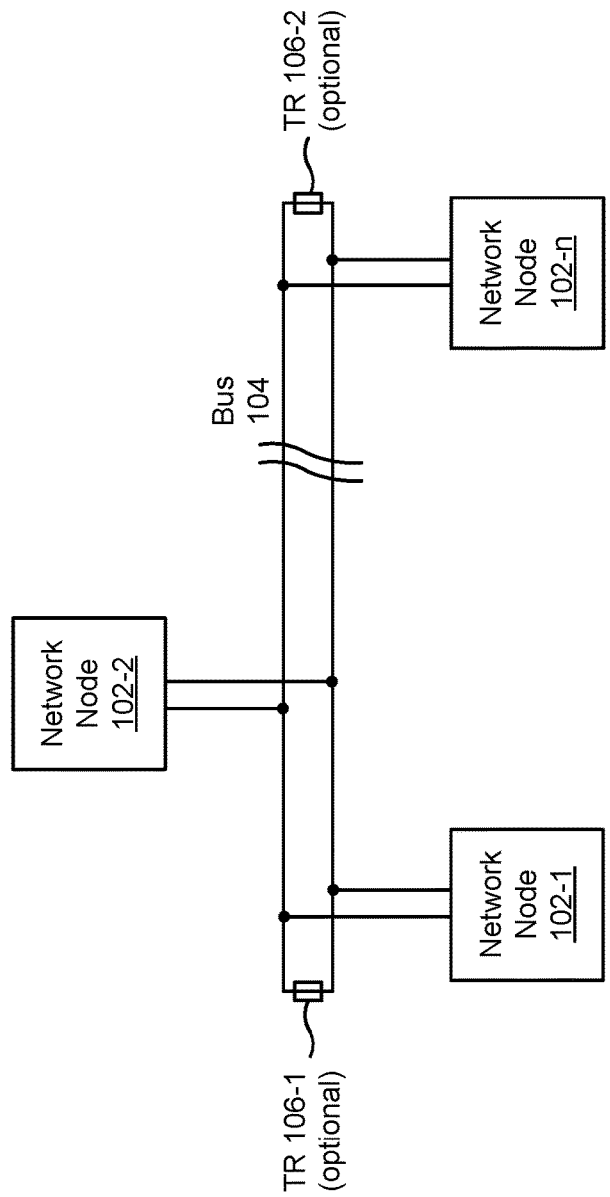
FIG. 1A is a diagram illustrating an example of a bus-based communication system.

FIG. 1A is a diagram illustrating an example of a bus-based communication system 100. FIG. 1A illustrates an example of a bus-based communication system 100 connecting a group of network nodes 102 (e.g., network node 102-1 through network node 102-n (n>1)). In the example of FIG. 1A, a communication bus 104 is shown as a two-line bus system, which may be implemented as two differential lines. Notably, other implementations of a communication bus are possible. In bus-based communication system 100, a network node 102 may selectively apply a direct current (DC) voltage signal across the bus terminals to transmit a dominant bit or a recessive bit. For example, a network node 102 may transmit a dominant bit (e.g., a logical "0" bit) by driving the high bus terminal to a high voltage (e.g., 5 volts DC (VDC)) and by driving the low bus terminal to a low voltage (e.g., 0 VDC), and may transmit a recessive bit (e.g., a logical "1" bit) by driving neither bus terminal. The bus terminals may extend between the network nodes 102 and enable information (e.g., information provided via a sensor, information for controlling an actuator, an operating parameter, or an operating condition, among other examples) to be communicated between the network nodes 102. As further shown in FIG. 1A, the bus-based communication system 100 may be terminated with (optional) termination resistors 106-1 and 106-2, which may serve to reduce reflections on the communication bus 104 that could otherwise affect signal quality along the communication bus 104.

In some cases, the network nodes 102 of the bus-based communication system 100 may communicate with one another according to a message-based communication protocol. For example, the network node 102-1 may transmit a message as a frame of bits that are serially introduced into the communication bus 104 and serially received by the network node 102-2. A frame may generally include one or more designated fields that provide different types of information relating to the message contained in the frame. Notably, in the bus-based communication system 100, a message transmitted by any network node 102 is broadcast on the communication bus 104, meaning that any other network node 102 can receive the message on the communication bus 104.

Examples of protocols that may be used in a bus-based communication system 100 include CAN protocol, CAN FD protocol, CAN XL protocol, local interconnect network (LIN) protocol, and an Ethernet protocol (e.g., 10base-T1S protocol). Notably, while implementations described herein are described in the context of CAN variants, such as CAN XL, the techniques described herein may be applied to other types of bus-based communication systems.

An in-vehicle communication network may include one or more bus-based communication systems 100. A bus-based communication system 100 in an in-vehicle communication network may have particular attributes reflecting requirements for in-vehicle networks. As an example, an in-vehicle bus-based communication system 100 may support communication of sensor data to a control unit by data frames being transmitted from the sensor or a control unit of the sensor to a control unit on a higher level. A particular protocol may be used for the data frames or protocol frames communicated between individual network nodes or participants of the bus-based communication system 100. In return or in response to receipt of sensor data, the control unit of the sensor or the control unit on the higher level may communicate information associated with an action to an actuator coupled to the bus. As a particular example, with reference to FIG. 1A, network node 102-1 may represent an angle sensor measuring an angle of a brake pedal. Network node 102-1 may transmit information indicating the measured angle in one or more protocol frames to network node 102-2, which may be an ECU. In response to receiving the information associated with the angle, the network node 102-2 may transmit one or more bus frames to network node 102-n, which may be a brake actuator. These frames, when received by the network node 102-n, may cause a braking action. Bus-based communications related to such an action are time critical and, therefore, should be transmitted, received, and processed quickly (e.g., in real-time or near real-time). Such timing requirements are not common in a typical communication network.

Further, in-vehicle communication networks typically have a well-defined number of network nodes that, generally, remain constant over a lifetime of a vehicle. Likewise, existing links between individual network nodes are not likely to be altered over the lifetime of the vehicle and, therefore, a topology of a given bus-based communication system 100 in an in-vehicle communication network is likely to remain constant. In a conventional computer network, such a situation is unlikely.

In a bus-based communication system 100, authenticity of a protocol frame transmitted over the communication bus 104 may be desirable, particularly in association with controlling a function of a vehicle. Taking a braking action as an example, a command causing an emergency braking should not be mistaken for a gentle braking when parking the vehicle in a controlled manner. To this end, an indication of authenticity of a frame communicated between participants of the bus-based communication system is advantageous. In some cases, authenticity of a frame can be provided at a data link layer (layer 2) of a given network node 102. In general, indicating authenticity of a protocol frame on a data link layer eliminates involvement of higher layers in authentication of (time-critical) commands communicated between participants of the bus-based communication system.

Further, with increasingly capable entertainment systems and increasing vehicle-to-vehicle communications, there is an increasing susceptibility to malicious commands or protocol frames being injected to a bus-based communication system 100 in an in-vehicle communication network. Therefore, bus-based communication system 100 may be configured to provide data security for frames (e.g., to prevent injection of the malicious frames). In some cases, data security can be provided at the data link layer or at a transport layer (layer 3). In some cases, data security may be provided on one or more other layers (e.g., one or more upper or lower layers) other than the transport layer and the data link layer.

The number and arrangement of devices shown in FIG. 1A are provided as examples. In practice, there may be additional devices, fewer devices, different devices, or differently arranged devices than those shown in FIG. 1A. Furthermore, two or more devices shown in FIG. 1A may be implemented within a single device, or a single device shown in FIG. 1A may be implemented as multiple, distributed devices. Additionally, or alternatively, a set of devices (e.g., one or more devices) of FIG. 1A may perform one or more functions described as being performed by another set of devices of FIG. 1A. For example, while bus-based communication system 100 is shown with two bus terminals, the communication bus 104 may interconnect the network nodes 102 using a different number of bus terminals and/or using a different arrangement of bus terminals that interconnect a different arrangement of network nodes 102. As another example, the communication bus 104 may be arranged in another topology, such as a ring topology (e.g., in which ends of the communication bus are electrically coupled to a single master unit). As another example, the communication bus 104 may comprise a plurality of communication buses 104 and/or be in selective communication with one or more additional communication buses 104.

Figure 1B:
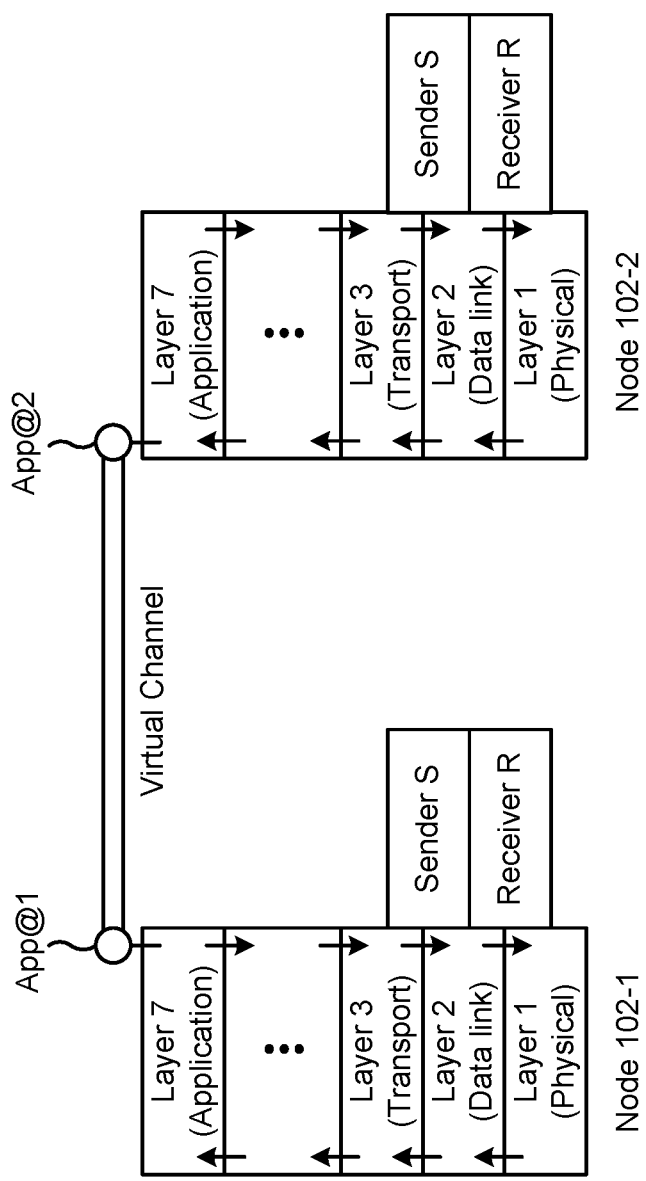
FIG. 1B illustrates an example of a communication stack and virtual channels between a pair of network nodes of a bus-based communication system.

FIG. 1B illustrates an example of a communication stack and virtual channels between a pair of network nodes 102 of a bus-based communication system 100, with network node 102-1 and network node 102-2 being shown as an example. As shown in FIG. 1B, communication between network node 102-1 and network node 102-2 flows in layers that can be categorized according to, for example, the OSI-ISO layer model. The lowest level layer (layer 1) is referred to as the physical layer. Each layer in the model can accept an order from a higher layer, perform some action at its level, and trigger a task in a lower layer by forwarding a request to the lower layer. For example, a command to the data link layer (layer 2) may be received from the transport layer (layer 3), as indicated by the downward arrow between the transport layer and the data link layer. Similarly, a command to the physical layer (layer 1) may be received from the data link layer, as indicated by the downward arrow between the physical layer and the data link layer. The physical layer of network node 102-1 may use a connection or link to network node 102-2 in order to communicate data on the physical layer to network node 102-2. Similarly, network node 102-1 may receive data from network node 102-2 over the physical link between network node 102-1 and network node 102-2. Here, the physical layer of network node 102-1 may forward the received data to the data link layer and, after processing at the data link layer, the data link layer may forward data to the transport layer. This forwarding is indicated by the upward arrow between the physical layer and the data link layer of network node 102-1 and the upward arrow between the data link layer and the transport layer of network node 102-1. The protocol flow in network node 102-2 is similar to that of network node 102-1. Notably, some existing bus-based communication networks within in-vehicle communication networks do not follow the separation of the physical layer and the data link layer as suggested in the OSI-ISO model. To reflect this, a sender S and receiver R are depicted in FIG. 1B as extending over the physical layer and the data link layer.

In some cases, techniques for providing authenticity of data communication in vehicles are implemented in the application layer (layer 7) using a software stack, indicated as App@1 and App@ 2 in FIG. 1B. Further, it may be useful to introduce a concept of virtual channels between network node 102-1 and network node 102-2 to indicate an authenticated and/or protected communication between two or more participants using the software stacks App@1 and App@2. One example associated with providing security for onboard networks, in a vehicle using software stacks, is secure onboard communication (SEC OC) according to the automotive open system architecture (AUTOSAR) standard. In some bus-based communication systems 100, functionality pertaining to authenticity and/or data security is limited to one or two lower layers of an individual network node 102 of the bus-based communication system 100. Limiting the authenticity and/or data security functionality to, for example, the data link layer and/or the transport layer may eliminate a need for higher protocol layers to be involved in data integrity and/or data security operations, thereby reducing an amount of time needed to receive, transmit, or process a given communication over the bus-based communication system 100.

The number and arrangement of layers shown in FIG. 1B are provided as one or more examples. In practice, there may be additional layers, fewer layers, different layers, or differently arranged layers than those shown in FIG. 1B. Furthermore, two or more layers shown in FIG. 1B may be implemented within a single layer, or a single layer shown in FIG. 1B may be implemented as multiple, distributed layers. Additionally, or alternatively, a set of layers (e.g., one or more layers) of FIG. 1B may perform one or more functions described as being performed by another set of layers of FIG. 1B.

Figure 1C:
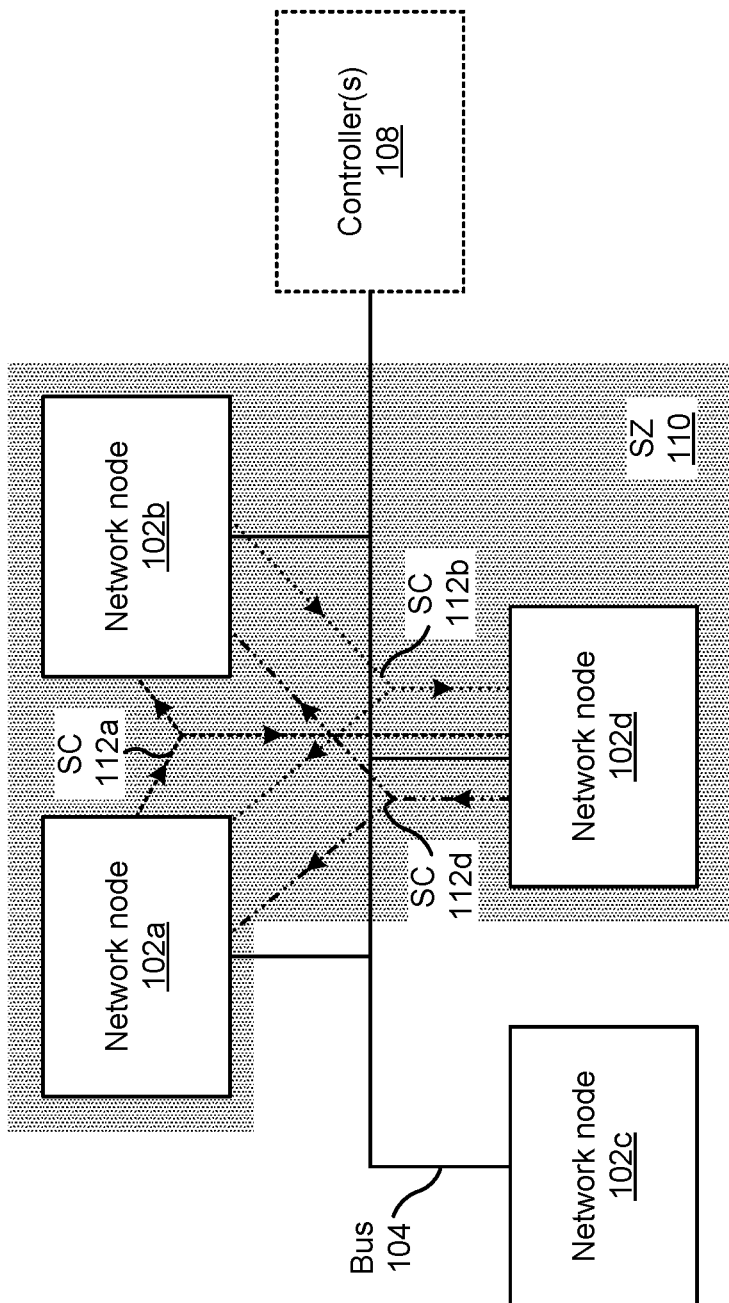
FIG. 1C is a diagram illustrating an example of a bus-based communication system that enables secure communication between network nodes of an in-vehicle communication network comprising one or more bus-based communication systems.

FIG. 1C is a diagram illustrating an example of environment that enables secure communication between network nodes 102 as described herein. As shown, the example bus-based communication system 100 in FIG. 1C includes a plurality of network nodes 102 (e.g., network nodes 102a through 102d are shown in FIG. 1C) and one or more controllers 108 connected to the communication bus 104. In some implementations, two or more network nodes 102 shown in FIG. 1C may be included in the same bus-based communication system 100. In some implementations, two or more network nodes 102 shown in FIG. 1C may spread across multiple bus-based communication systems 100 (e.g., two or more bus-based communication systems 100 that are connected by one or more controllers 108).

A controller 108 is a device configured to control or manage operation of one or more network nodes 102 of one or more bus-based communication systems 100. For example, the controller 108 may be configured to receive a message from a first network node 102 (e.g., network node 102a), where the message is destined for a second network node 102 (e.g., network node 102b). The controller 108 may determine a priority of the message based at least in part on one or more characteristics of the message, and may provide the message to an output buffer for transmission to the second network node 102 based at least in part on the priority of the message, as described herein. In some implementations, the controller 108 may be configured to control or manage operation of one or more network nodes 102 within a single bus-based communication system 100 or a plurality of network nodes 102 across multiple bus-based communication systems 100 that are connected via the controller 108.

As shown in FIG. 1C, one or more network nodes 102 of the one or more bus-based communication systems 100 may be included a secure zone (SZ) 110 defined by a set of secure channels (SCs) 112. In the example shown in FIG. 1C, network node 102a, network node 102b, and network node 102d are included in the SZ 110, and the SZ 110 includes an SC 112a, an SC 112b, and an SC 112d. In some implementations, the SZ 110 may be within a single bus-based communication system 100 or may span multiple bus-based communication systems 100 (e.g., through one or more gateways). As indicated above, the SZ 110 may be defined by a set of SCs 112 that enable network nodes 102 to securely transmit and receive communications.

In some implementations, an SC 112 is a unidirectional transmission channel. In some implementations, an SC 112 is a point-to-multipoint transmission channel. Alternatively, an SC 112 may in some implementations be a point-to-point transmission channel. In the example shown in FIG. 1C, the SC 112a is a unidirectional, point-to-multipoint channel that enables the network node 102a to transmit secure communications to the network node 102b and the network node 102d. Similarly, the SC 112b is a unidirectional, point-to-multipoint channel that enables the network node 102b to transmit secure communications to the network node 102a and the network node 102d. Further, the SC 112d is a unidirectional, point-to-multipoint channel that enables the network node 102d to transmit secure communications to the network node 102a and the network node 102b. In some implementations, each SC 112 of the SZ 110 is associated with an SC identifier (SCI) that is unique within the one or more bus-based communication systems 100.

In some implementations, an SC 112 may have one or more secure associations (SAs). An SA is a security parameter of the SC 112 based on which a security key can be identified. In some implementations, a given SC 112 may have multiple SAs (e.g., two SAs).

The number and arrangement of layers shown in FIG. 1C are provided as one or more examples. In practice, there may be additional layers, fewer layers, different layers, or differently arranged layers than those shown in FIG. 1C. Furthermore, two or more layers shown in FIG. 1C may be implemented within a single layer, or a single layer shown in FIG. 1C may be implemented as multiple, distributed layers. Additionally, or alternatively, a set of layers (e.g., one or more layers) of FIG. 1C may perform one or more functions described as being performed by another set of layers of FIG. 1C.

As vehicle functions supported by network nodes 102 in in-vehicle communication networks including one or more bus-based communication systems 100 evolve, security requirements increase so as to ensure safe and secure operation with respect to communication among the network nodes 102. CAN secure (CANsec) protocol is a data link layer protocol that can be used in order to provide data plane security in a bus-based communication system 100 at the data link layer. The CANsec protocol can be implemented in conjunction with, for example, the CAN XL protocol. However, no protocol exists for providing control plane security in a bus-based communication system 100 that utilizes the CAN protocol or a variant of the CAN protocol, such as CAN FD or CAN XL. According to the various CAN protocols, the control plane is responsible for tasks such as security key distribution, agreement among network nodes 102 on new security keys, and distributing certificates (on a higher layer). Therefore, operation of the control plane may not be adequately secure in an in-vehicle communication network that includes a bus-based communication system 100 that utilizes a given type of CAN protocol.

Some implementations described herein provide techniques and apparatuses associated with a key indication protocol. In some aspects, a device of an in-vehicle communication network may generate a control plane message. Here, according to the key indication protocol, the control plane message may include an indication that the control plane message is a control plane message, an indication that the control plane message is associated with security, an indication of a security key to be associated with an SZ of the in-vehicle communication network (e.g., a security key to be used for symmetric cryptography), and an indication of a freshness value (e.g., an initial value of a freshness value, a value for the freshness value that is to be used for resynchronization, or the like). The device may then transmit the control plane message in association with indicating that a network node is to perform a cryptographic operation for a data plane message associated with the SZ using the security key. In some aspects, the network node may receive the control plane message and perform the cryptographic operation for the data plane message associated with the SZ using the security key.

In some implementations, the key indication protocol described herein can be utilized to improve security for a control plane of an in-vehicle communication network, such as an in-vehicle communication network including one or more bus-based communication systems 100 that utilize a CAN protocol, such as CAN XL. Notably, the key indication protocol described herein does not require additional hardware at a given network node 102, which reduces cost associated with implementation of the key indication protocol. Further, the key indication protocol is advantageous for hardware vendors by (1) allowing control plane messages to be processed in a controller (e.g., routing engine) to accelerate routing and (2) enabling low-level drivers to support software implementation using a hardware/software co-design. Additional details are provided below.

FIGS. 2A and 2B are diagrams illustrating examples associated with a key indication protocol for a bus-based communication system 100. As shown in FIG. 2A, an example 200 comprises communication between a control plane message transmitter 202 and a network node 102 included in an SZ 110. In some implementations, the control plane message transmitter 202 may correspond to a controller 108. Alternatively, the control plane message transmitter 202 may correspond to another network node 102. Although not shown, one or more other network nodes 102 may be included in the SZ 110.

As shown at reference 250, the control plane message transmitter 202 may generate a control plane message to be transmitted to the network node 102. In some implementations, the control plane message is a message associated with indicating a security key to be used by the network node 102 in association with performing a cryptographic operation for communication of a data plane message associated with the SZ 110.

In some implementations, the control plane message may include an indication of a security key to be associated with the SZ 110 of the in-vehicle communication network. For example, the control plane message may include an indication of a security key to be used within the SZ 110 (e.g., for all SCs 112 of the SZ 110). As another example, the control plane message may include an indication of a security key to be used for one or more particular SCs 112 of the SZ 110 (e.g., a subset of SCs 112 of the SZ 110). As another example, the control plane message may include an indication of a security key to be used for an SA of one or more SCs 112 of the SZ 110. In some implementations, the control plane message may include an indication of one or more security keys to be used within one or more SZs 110, an indication of one or more security keys to be used for one or more SCs 112, and/or an indication of one or more security keys to be used for one or more SAs. Thus, a single control plane message may in some implementations indicate security keys to be used for multiple SZs 110, SCs 112, and/or SAs.

In some implementations, the indication of the security key includes a key identifier corresponding to the security key. For example, the network node 102 may be configured with a set of security keys (e.g., a set of previously generated keys that is stored on the network node 102). Here, each security key may be associated with a corresponding key identifier in a set of key identifiers. In such a scenario, if the indication of the security key includes a key identifier, then the network node 102 may identify the security key configured on the network node 102 that corresponds to the key identifier. In such an implementation, the security key itself need not be communicated on the communication bus 104, thereby improving security with respect to key indication. Further, in such an implementation, a size of the control plane message is reduced (e.g., as compared a control plane message that includes the security key itself).

Alternatively, the indication of the security key may in some aspects include information associated with generating the security key. For example, the indication of the security key may include information indicating a manner in which the network node 102 is to generate the security key (e.g., one or more parameters based on which the network node 102 is to generate the security key). In such a scenario, the network node 102 may receive the information associated with generating the security key, and may generate the security key accordingly (i.e., based on another security key associated with the SZ 110 and the information associated with generating the security key as indicated in the control plane message). In such an implementation, the security key itself need not be communicated on the communication bus 104, thereby improving security with respect to key indication. Further, such an implementation improves flexibility of key indication by, for example, allowing the control plane message transmitter 202 to trigger generation of new security keys as needed. Further, in such an implementation, a size of the control plane message is reduced (e.g., as compared a control plane message that includes the security key itself).

Alternatively, the indication of the security key may in some implementations include the security key. That is, the indication of the security key may include the security key. Such an implementation reduces burden on the network node 102 with respect to management or generation of security keys, while improving flexibility of key indication by, for example, allowing the control plane message transmitter 202 to transmit new security keys as needed.

In some implementations, the control plane message may include an indication that the control plane message is a control plane message. That is, the control plane message may including information indicating that the control plane message is a control plane message (e.g., rather than a data plane message).

In some implementations, the control plane message may include an indication that the control plane message is associated with security. That is, the control plane message may in some implementations include an indication that the control plane message is associated with security. In some implementations, the indication that the control plane message is associated with security may include, for example, one or more bits (e.g., a one-bite flag) carrying an indication that the control plane message is associated with security, information that identifies the SZ 110 associated with the security key indicated in the message, information that identifies an SC 112 of the SZ 110 associated with the security key indicated in the message, or information that identifies an SA of an SC 112 of the SZ 110 associated with the security key indicated in the message.

In some implementations, the control plane message may include an indication of a freshness value. That is, the control plane message may in some implementations include a value (e.g., an initial value) for a freshness value or nonce of an SA associated with the security key.

In some implementations, the control plane message includes control data. The control data can include, for example, information indicating a cipher mode associated with the security key (e.g., authenticated-only, authentication and encryption, or the like), a cipher suite associated with the security key, or a security protocol version (e.g., a CANsec version) associated with the security key.

In some implementations, the control plane message includes a sequence number (e.g., a nonce, a freshness value, or the like) for an SC 112 associated with the security key. In some implementations, the sequence number may be used in association with authenticating or decrypting the control plane message.

In some implementations, the control plane message is a secure message (e.g., an authenticated message or an authenticated and encrypted message). In some implementations, the control plane message transmitter 202 may secure the control plane message using a dedicated freshness value and a dedicated security key associated with a higher-level protocol (e.g., a network layer protocol). That is, in some implementations, the control plane message is secured using a dedicated freshness value and a dedicated security key which is itself a product of the higher-level protocol.

As shown at reference 252, the control plane message transmitter 202 may transmit, and the network node 102 may receive, the control plane message. In some implementations, the control plane message transmitter 202 transmits the control plane message in association with indicating that the network node 102 is to perform a cryptographic operation for a data plane message associated with the SZ 110 using the security key.

In some implementations, the control plane message transmitter 202 may transmit the control plane message for reception by multiple network nodes 102. For example, the control plane message transmitter 202 may transmit the control plane message for reception by each network node 102 in the SZ 110 (e.g., if the control plane message includes an indication of a security key to be used for all SCs 112 of the SZ 110). As another example, the control plane message transmitter 202 may transmit the control plane message for reception by a subset of network nodes 102 in the SZ 110 associated with a particular SC 112 (e.g., if the control plane message includes an indication of a security key to be used for the particular SC 112). As another example, the control plane message transmitter 202 may transmit the control plane message for reception by each network node 102 in the SZ 110 associated with a particular SA (e.g., if the control plane message includes an indication of a security key to be used for an SA of one or more SCs 112).

As shown at reference 254, the network node 102 may perform a cryptographic operation for a data plane message associated with the SZ using the security key. For example, after receiving the control plane message, the network node 102 may determine the security key (e.g., based on a key identifier included in the control plane message, based on generating the security key according to one or more parameters indicated in the control plane message, based on the security key being included in the control plane message, or the like). In one example, the network node 102 may use the security key in association with encrypting a data plane message to be transmitted to another network node 102 within the SZ 110. For example, the network node 102 may encrypt the data plane message using the security key, and may transmit the encrypted data plane message for reception by the other network node 102. In this example, the other network node 102 is configured (e.g., based on a control plane message provided to the other network node 102 by the control plane message transmitter 202) with the same security key as that used by the network node 102 to encrypt the message, and may therefore decrypt the encrypted data plane message. In another example, the network node 102 may use the security key in association with decrypting a data plane message received from another network node 102 within the SZ 110. For example, the other network node 102 may be configured (e.g., based on a control plane message provided to the other network node 102 by the control plane message transmitter 202) with the same security key as that to be used by the network node 102. In this example, the other network node 102, may encrypt the data plane message using the security key, and may transmit the encrypted data plane message for reception by the network node 102. The network node 102 may receive the encrypted data plane message and may decrypt the encrypted data plane message using the security key.

FIG. 2B is a diagram illustrating an example structure of the control plane message protocol unit associated with the key indication protocol for providing control plane security in a bus-based communication system 100.

As shown in FIG. 2B, the control plane message may include a control indication field. In some implementations, the control indication field may carry a value (e.g., a one-bit flag) indicating that the control plane message is a control plane message. For example, a particular value (e.g., a value of 1), if present in the control indication field, may serve as an indication that the control plane message is a control plane message (e.g., whereas a value of 0 may be indicated in the control indication field for non-control plane messages).

As further shown, the control plane message may in some implementations include an SZ or SA indication field. In some implementations, the SZ/SC/SA indication field is used to carry a value indicating the SZ 110 (e.g., an SZ identifier (SZI)), the SC 112 (e.g., an SC identifier (SCI)), and/or the SA (e.g., an SA identifier (SAI)) to which the control plane message applies. For example, in some implementations, the SZ/SC/SA indication field may carry a value identifying an SC 112 to which the control plane message applies (i.e., an SC 112 that is to utilize the security key indicated in the control plane message).

As further shown, the control plane message may in some implementations include a security key (SK) indication field. In some implementations, the SK indication field is used to carry the indication of the security key. For example, the SK indication field may carry a key identifier that identifies a security key. As another example, the SK indication field may carry information indication one or more parameters based on which the security key is to be generated. As another example, the SK indication field may carry the security key itself.

As further shown, the control plane message may in some implementations include control data field. The control data field can be used to carry, for example, information indicating a cipher mode associated with the security key (e.g., authentication only, authentication and encryption), a cipher suite associated with the security key, or a security protocol version (e.g., a CANsec version) associated with the security key, among other examples.

As further shown, the control plane message may in some implementations include a freshness value (FV) field. The freshness value field can be used to carry, for example, an initial value for a freshness value or nonce of an SA.

As indicated above, FIGS. 2A and 2B are provided as an example. Other examples may differ from what is described with regard to FIGS. 2A and 2B.

Figure 3A:
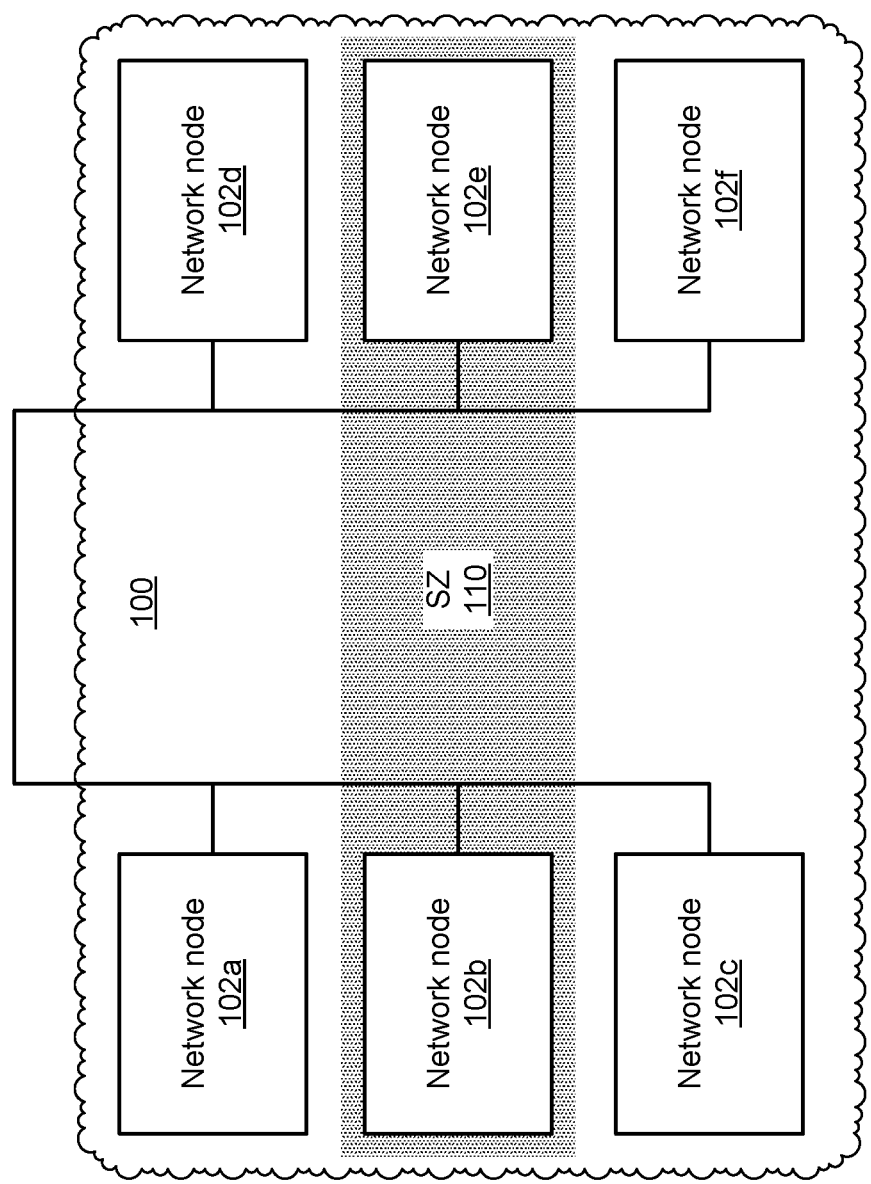
FIGS. 3A-3C are diagrams illustrating example scenarios in which the key indication protocol described herein may be implemented.
Figure 3B:
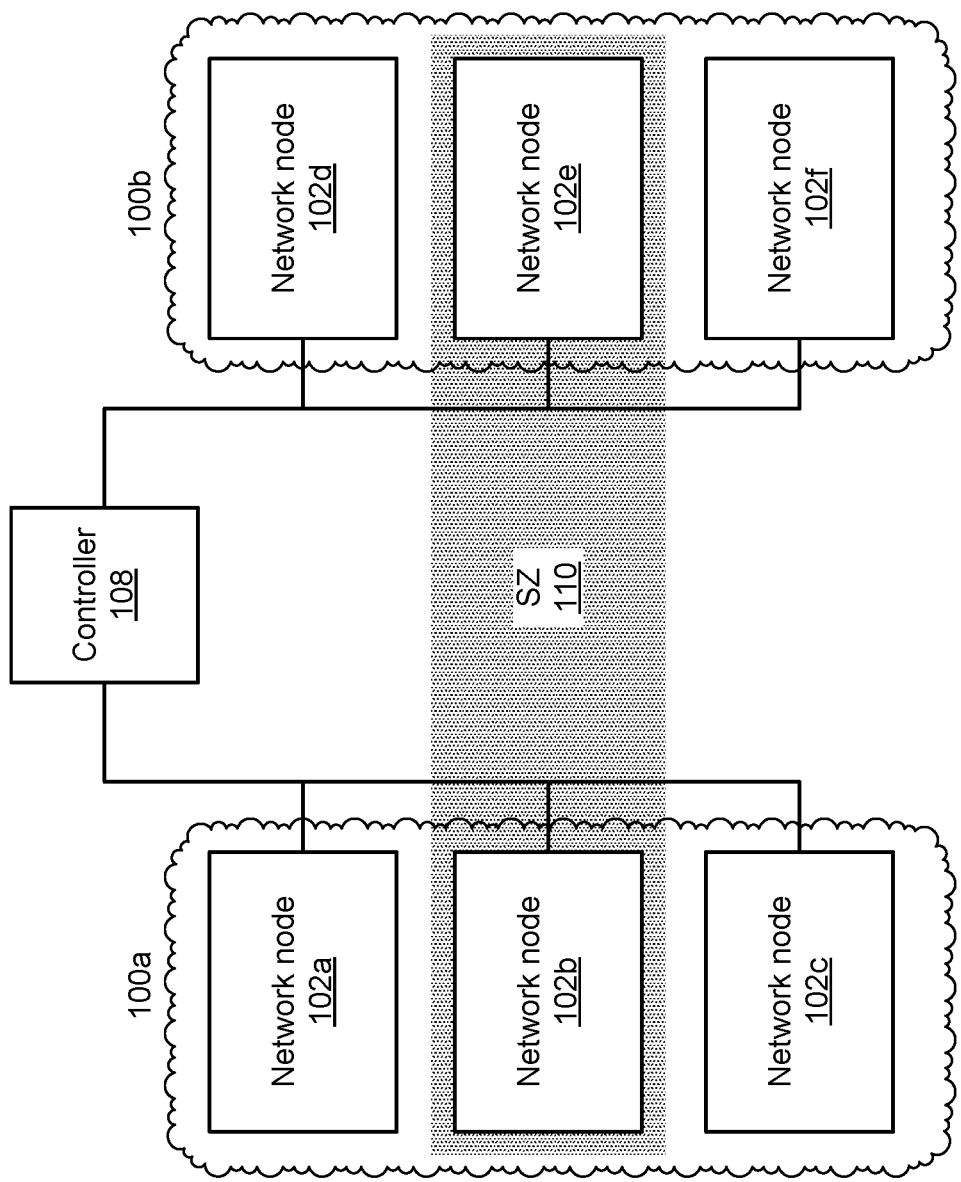
Figure 3C:
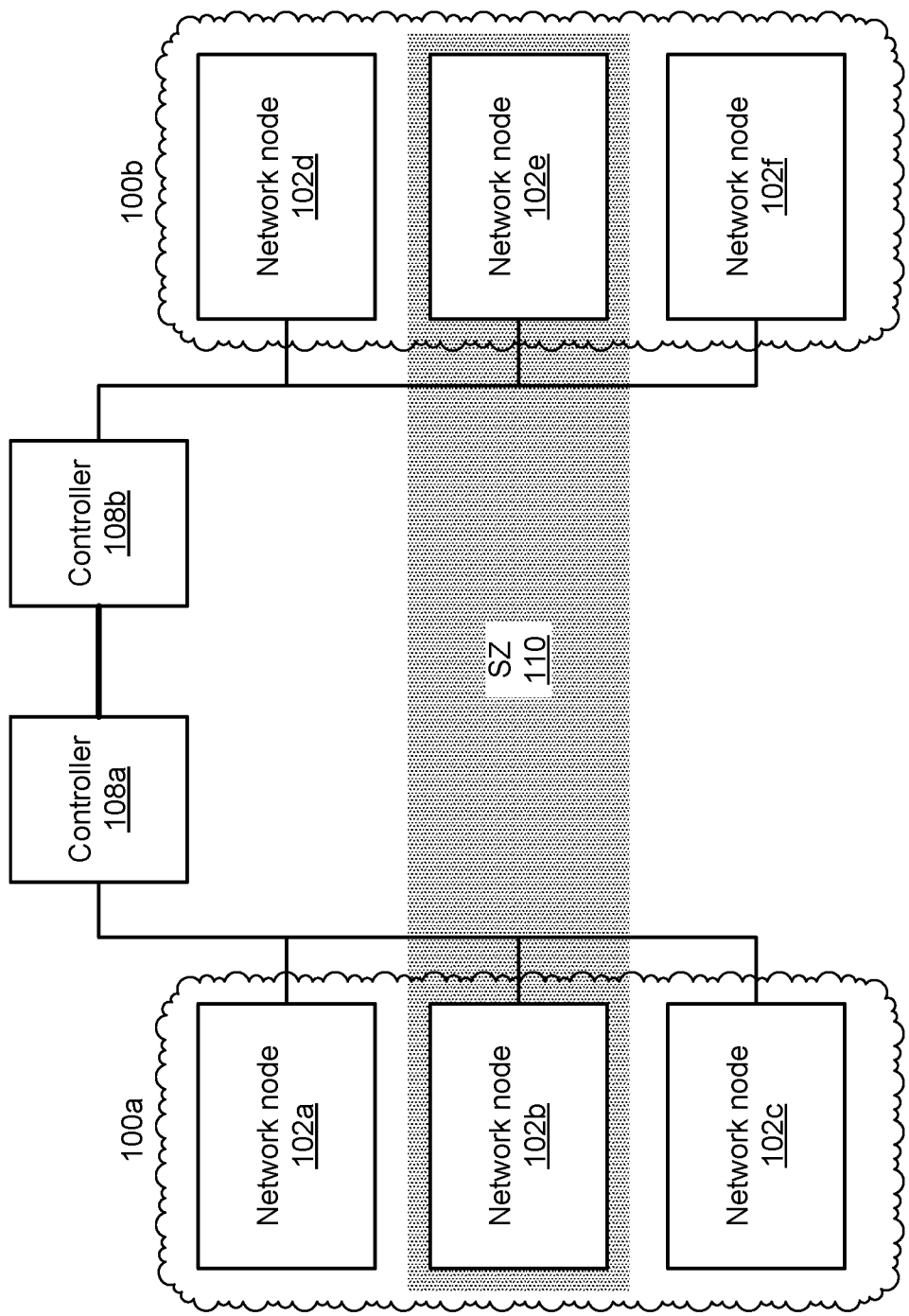

FIGS. 3A-3C are diagrams illustrating example scenarios in which the key indication protocol for providing control plane security described herein may be implemented.

In the example shown in FIG. 3A, an in-vehicle communication network includes a bus-based communication system 100 (e.g., a CAN network) including a group of network nodes 102a through 102f, with network node 102b and network node 102e being within an SZ 110 defined by one or more SCs 112 (not shown). The key indication protocol described herein can be used in this example scenario for key indication that causes the network node 102b and the network node 102c in the SZ 110 to utilize the same security key, thereby facilitating secure communication between the network node 102b and the network node 102e via the one or more SCs 112 of the SZ 110.

In the example shown in FIG. 3B, an in-vehicle communication network includes a first bus-based communication system 100a (e.g., a first CAN network) including a group of network nodes 102a through 102c and a second bus-based communication system 100b (e.g., a second CAN network) including a group of network nodes 102d through 102f, with the first bus-based communication system 100a and the second bus-based communication system 100b being connected by a controller 108 (e.g., a CAN bridge). In this example, the network node 102b and network node 102e are within an SZ 110 defined by one or more SCs 112 (not shown). The key indication protocol described herein can be used in this example scenario for key indication that causes the network node 102b and the network node 102c in the SZ 110, despite being in different bus-based communication systems 100, to utilize the same security key, thereby facilitating secure communication between the network node 102b and the network node 102e via the one or more SCs 112 of the SZ 110.

In the example shown in FIG. 3C, an in-vehicle communication network includes a first bus-based communication system 100a (e.g., a first CAN network) including a group of network nodes 102a through 102c and a second bus-based communication system 100b (e.g., a second CAN network) including a group of network nodes 102d through 102f, with the first bus-based communication system 100a being connected to a first controller 108a and the second bus-based communication system 100b is connected to a second controller 108. Here, the first controller 108a and the second controller are connected to one another (e.g., via an Ethernet connection, to form a CAN-Ethernet-CAN network). In this example, the network node 102b and network node 102e are within an SZ 110 defined by one or more SCs 112 (not shown). The key indication protocol described herein can be used in this example scenario for key indication that causes the network node 102b and the network node 102c in the SZ 110, despite being in different bus-based communication systems 100 and separated by another type of network, to utilize the same security key, thereby facilitating secure communication between the network node 102b and the network node 102e via the one or more SCs 112 of the SZ 110.

As indicated above, FIGS. 3A-3C are provided as an example. Other examples may differ from what is described with regard to FIGS. 3A-3C. The number and arrangement of devices shown in FIGS. 3A-3C are provided as an example. In practice, there may be additional devices, fewer devices, different devices, or differently arranged devices than those shown in FIGS. 3A-3C. Furthermore, two or more devices shown in FIGS. 3A-3C may be implemented within a single device, or a single device shown in FIGS. 3A-3C may be implemented as multiple, distributed devices. Additionally, or alternatively, a set of devices (e.g., one or more devices) shown in FIGS. 3A-3C may perform one or more functions described as being performed by another set of devices shown in FIGS. 3A-3C.

Figure 4:
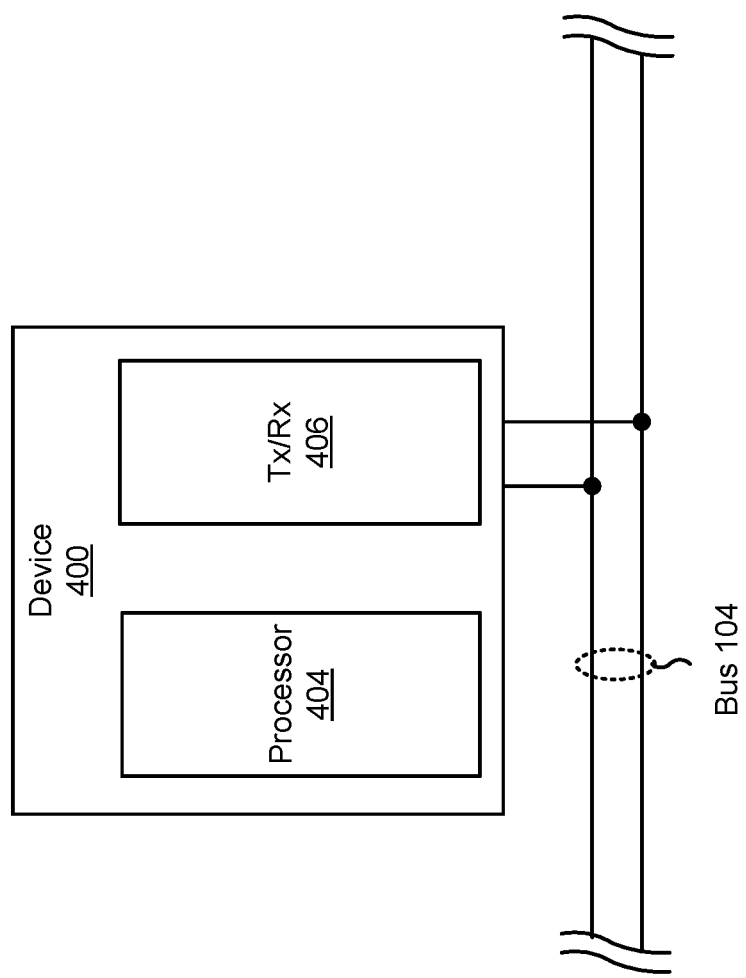
FIGS. 4 and 5 are diagrams of example components of devices associated with a key indication protocol for an in-vehicle communication network.

FIG. 4 is a diagram of an example of a device 400 associated with a key indication protocol for an in-vehicle communication network. In some implementations, the device 400 may correspond to a network node 102 and/or a control plane message transmitter 202. As shown in FIG. 4, the device 400 may include a processor 404 and a transceiver (e.g., Tx/Rx) 406 connected to a communication bus 104 (e.g., a CAN bus).

The device 400 may include one or more devices associated with controlling one or more other devices and/or one or more electrical systems and/or electrical subsystems based, for example, on sensor data provided by sensors connected to the device 400 via a sensor interface component of the device 400 (not shown), control data for controlling actuators connected to the device 400 via an actuator interface component of node (not shown), and/or the like. In a vehicle system, for example, the device 400 may include an ECU, an ECM, a PCM, a TCM, a BCM, a CCM, a CTM, a GEM, a BCM, a SCM, or another type of electrical system or electrical subsystem of a vehicle.

Processor 404 includes a device (e.g., one or more integrated circuits) that operates as an embedded system for providing the control functionality associated with the device 400. For example, processor 404 includes one or more central processing units (CPUs), memories, and/or programmable input/output (I/O) peripherals that allow processor 404 to operate as an embedded system. In some examples, processor 404 may send information to and/or receive information from transceiver 406.

Transceiver 406 includes a component via which the device 400 may transmit and receive information. For example, transceiver 406 may include a differential line transceiver, or a similar type of component. In some examples, transceiver 406 includes a transmit (Tx) component that allows the device 400 to transmit information (e.g., to another node) via communication bus 104, and/or a receive (Rx) component that allows the device 400 to receive information (e.g., from another node that is similar to the device 400) via communication bus 104. In some examples, transceiver 406 may include a line driver for enabling the Tx component (to transmit information) or the Rx component (to receive information) at a given time. In some examples, transceiver 406 may be a CAN transceiver, a LIN transceiver, a FlexRay transceiver, an Ethernet transceiver, or another type of transceiver associated with another type of bus system. In some examples, the device 400 may include multiple transceivers 406 of different types.

Communication bus 104 includes a bus for carrying information from or to the device 400. In some examples, communication bus 104 may comprise a connection (e.g., including one or more terminals, wires, and/or connectors) via which multiple network nodes 102 are connected to one another. In some examples, communication bus 104 may include a set of connections, each associated with one or more network nodes 102. In some examples, communication bus 104 may be a CAN bus, a CAN FD bus, a CAN XL bus, a LIN bus, a FlexRay bus, an Ethernet bus, and/or another type of bus. In some examples, each transceiver 406 of the device 400 may be connected to an associated communication bus 104.

The number and arrangement of devices and components shown in FIG. 4 is provided as an example. In practice, there may be additional devices and/or components, fewer devices and/or components, different devices and/or components, or differently arranged devices and/or components than those shown in FIG. 4. Furthermore, two or more devices and/or components shown in FIG. 4 may be implemented within a single device and/or component, or a single device and/or a single component shown in FIG. 4 may be implemented as multiple, distributed devices and/or components. Additionally, or alternatively, a set of devices and/or components (e.g., one or more devices and/or components) of FIG. 4 may perform one or more functions described as being performed by another set of devices and/or components of FIG. 4.

Figure 5:
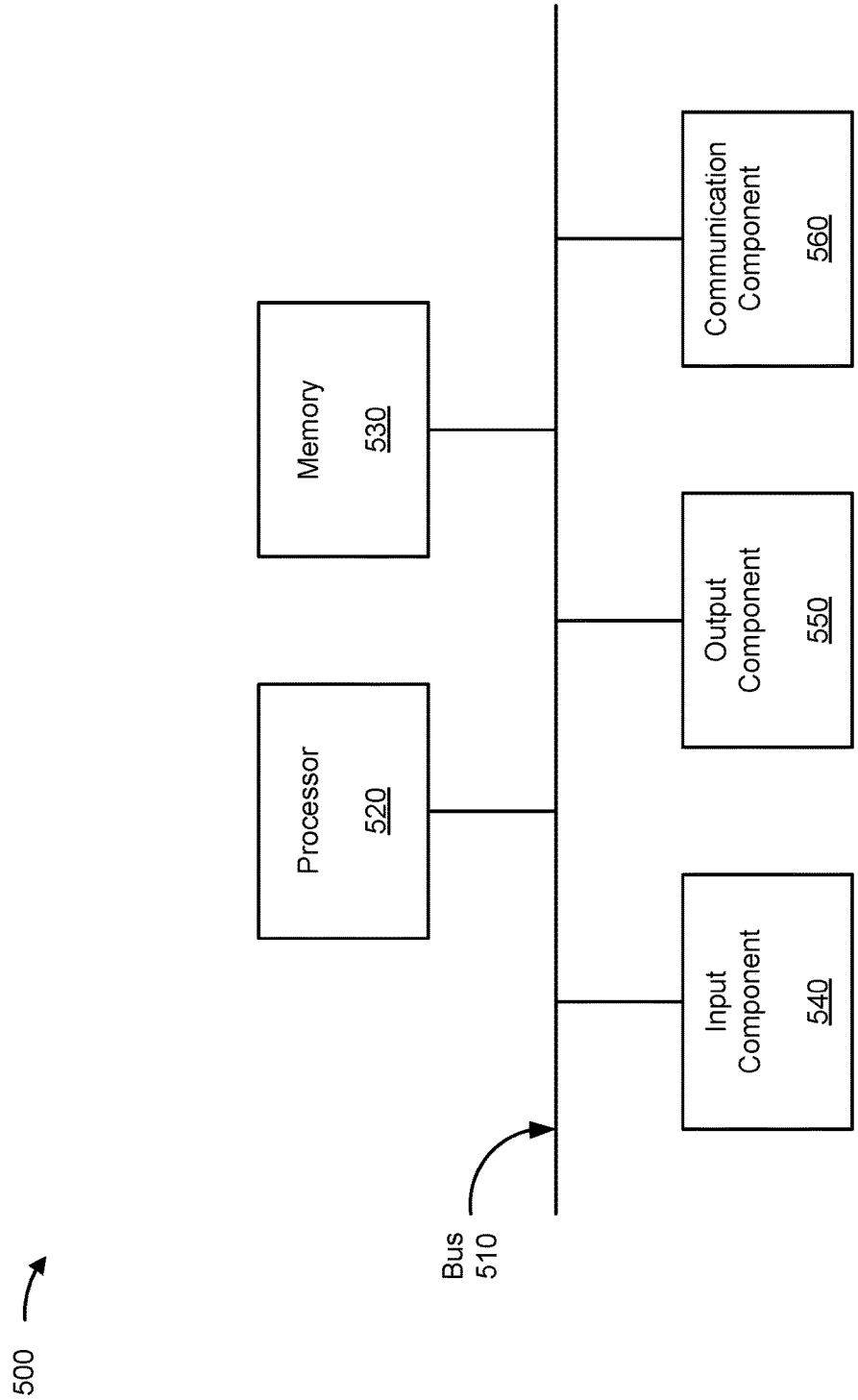

FIG. 5 is a diagram of example components of a device 500 associated with a key indication protocol for an in-vehicle communication network. The device 500 may correspond to controller 108. In some implementations, the controller 108 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
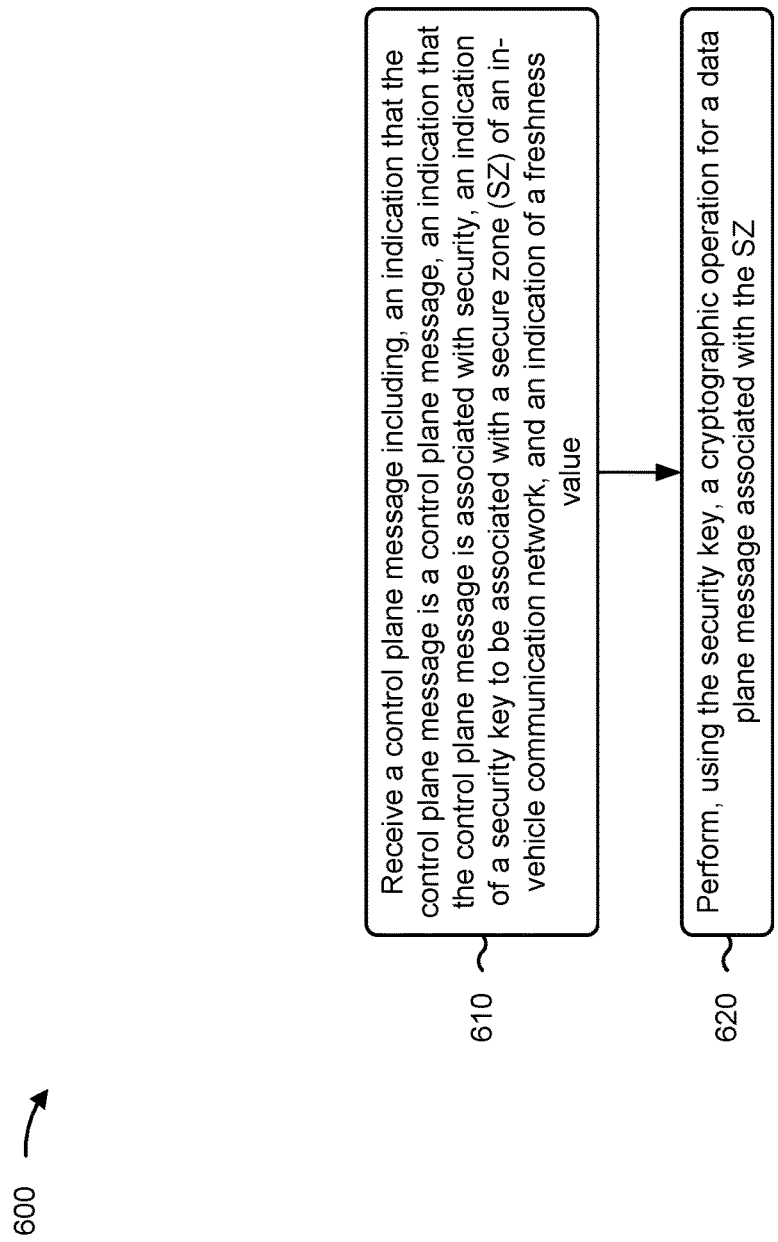
FIG. 6 is a flowchart of an example process associated with a key indication protocol for an in-vehicle communication network.

FIG. 6 is a flowchart of an example process 600 associated with a key indication protocol for a bus-based communication system 100. In some implementations, one or more process blocks of FIG. 6 are performed by a network node (e.g., network node 102). In some implementations, one or more process blocks of FIG. 6 may be performed by one or more components of device 400 described with respect to FIG. 4 or by one or more components of a device 500 described with respect to FIG. 5.

As shown in FIG. 6, process 600 may include receiving a control plane message including: an indication that the control plane message is a control plane message, an indication that the control plane message is associated with security, an indication of a security key to be associated with an SZ of an in-vehicle communication network, and an indication of a freshness value (block 610). For example, the network node may receive a control plane message including: an indication that the control plane message is a control plane message, an indication that the control plane message is associated with security, an indication of a security key to be associated with an SZ (e.g., an SZ 110) of an in-vehicle communication network (e.g., a bus-based communication system 100), and an indication of a freshness value, as described above.

As further shown in FIG. 6, process 600 may include performing a cryptographic operation for a data plane message associated with the SZ using the security key (block 620). For example, the network node may perform a cryptographic operation for a data plane message associated with the SZ using the security key, as described above.

Process 600 may include additional implementations, such as any single implementation or any combination of implementations described below and/or in connection with one or more other processes described elsewhere herein.

In a first implementation, the indication of the security key includes a key identifier corresponding to the security key.

In a second implementation, in combination with the first implementation, process 600 includes identifying the security key based on the key identifier, the security key being one of a set of security keys configured on the network node, each security key in the set of security keys being associated with a corresponding key identifier in a set of key identifiers.

In a third implementation, alone or in combination with one or more of the first and second implementations, the indication of the security key includes information associated with generating the security key.

In a fourth implementation, in combination with the third implementation, process 600 includes generating the security key based on the information associated with generating the security key.

In a fifth implementation, alone or in combination with one or more of the first through fourth implementations, the indication of the security key includes the security key.

In a sixth implementation, alone or in combination with one or more of the first through fifth implementations, the control plane message further includes control data.

In a seventh implementation, in combination with the sixth implementation, the control data includes information indicating at least one of a cipher mode associated with the security key, a cipher suite associated with the security key, or a security protocol version associated with the security key.

In an eighth implementation, alone or in combination with one or more of the first through seventh implementations, the control plane message further includes a sequence number for an SC (e.g., an SC 112) associated with the security key.

In a ninth implementation, alone or in combination with one or more of the first through eighth implementations, the control plane message is a secure message, the secure message being secured based on a dedicated freshness value and a dedicated security key associated with a higher-level protocol.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

Figure 7:
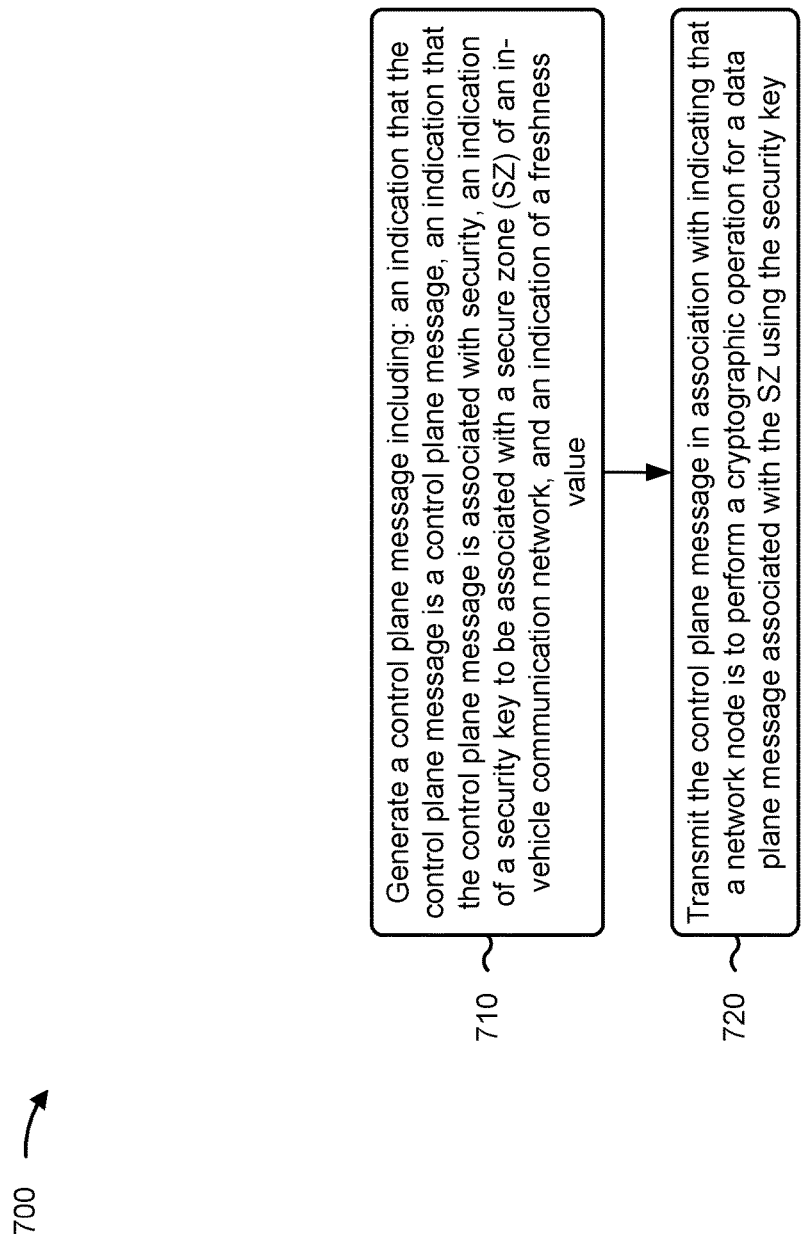
FIG. 7 is a flowchart of an example process associated with a key indication protocol for an in-vehicle communication network.

FIG. 7 is a flowchart of an example process 700 associated with a key indication protocol for an in-vehicle communication network. In some implementations, one or more process blocks of FIG. 7 are performed by a control plane message transmitter (e.g., a control plane message transmitter 202, which may correspond to a network node 102 or a controller 108). In some implementations, one or more process blocks of FIG. 7 may be performed by one or more components of device 400 described with respect to FIG. 4 or by one or more components of a device 500 described with respect to FIG. 5.

As shown in FIG. 7, process 700 may include generating a control plane message including an indication that the control plane message is a control plane message, an indication that the control plane message is associated with security, an indication of a security key to be associated with an SZ of an in-vehicle communication network, and an indication of a freshness value (block 710). For example, the control plane message transmitter may generate a control plane message including an indication that the control plane message is a control plane message, an indication that the control plane message is associated with security, an indication of a security key to be associated with an SZ (e.g., an SZ 110) of an in-vehicle communication network (e.g., a bus-based communication system 100), and an indication of a freshness value, as described above.

As further shown in FIG. 7, process 700 may include transmitting the control plane message in association with indicating that a network node is to perform a cryptographic operation for a data plane message associated with the SZ using the security key (block 720). For example, the control plane message transmitter may transmit the control plane message in association with indicating that a network node is to perform a cryptographic operation for a data plane message associated with the SZ using the security key, as described above.

Process 700 may include additional implementations, such as any single implementation or any combination of implementations described below and/or in connection with one or more other processes described elsewhere herein.

In a first implementation, the indication of the security key includes a key identifier corresponding to the security key.

In a second implementation, alone or in combination with the first implementation, the indication of the security key includes information associated with generating the security key.

In a third implementation, alone or in combination with one or more of the first and second fourth implementations, the indication of the security key includes the security key.

In a fourth implementation, alone or in combination with one or more of the first through third implementations, the control plane message further includes control data.

In a fifth implementation, in combination with the sixth implementation, the control data includes information indicating at least one of a cipher mode associated with the security key, a cipher suite associated with the security key, or a security protocol version associated with the security key.

In a sixth implementation, alone or in combination with one or more of the first through fifth implementations, the control plane message further includes a sequence number for an SC (e.g., an SC 112) associated with the security key.

In a seventh implementation, alone or in combination with one or more of the first through sixth implementations, the control plane message is a secure message, the secure message being secured based on a dedicated freshness value and a dedicated security key associated with a higher-level protocol.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network node, comprising:
one or more components configured to:
receive a control plane message including:
a control indication field providing an indication that the control plane message is a control plane message, wherein the control indication field carries a value associated with whether or not the control plane message is a control plane message,
an indication that the control plane message is associated with security, an indication of a security key to be associated with a secure zone (SZ) of an in-vehicle communication network, and
an indication of a freshness value;
distinguish the control plane message from non-control plane messages based on the indication that the control plane message is a control plane message, wherein the non-control plane messages include data frames and protocol frames; and
based on processing the control plane message, perform a cryptographic operation for a data plane message associated with the SZ using the security key.

2. The network node of claim 1, wherein the indication of the security key includes a key identifier corresponding to the security key.

3. The network node of claim 2, wherein the one or more components are further to identify the security key based on the key identifier, the security key being one of a set of security keys configured on the network node, each security key in the set of security keys being associated with a corresponding key identifier in a set of key identifiers.

4. The network node of claim 1, wherein the indication of the security key includes information associated with generating the security key.

5. The network node of claim 4, wherein the one or more components further configured to generate the security key based on the information associated with generating the security key.

6. The network node of claim 1, wherein the indication of the security key includes the security key.

7. The network node of claim 1, wherein the control plane message further includes control data.

8. The network node of claim 7, wherein the control data includes information indicating at least one of a cipher mode associated with the security key, a cipher suite associated with the security key, or a security protocol version associated with the security key.

9. The network node of claim 1, wherein the control plane message further includes a sequence number for a secure channel (SC) associated with the security key.

10. The network node of claim 1, wherein the control plane message is a secure message, the secure message being secured based on a dedicated freshness value and a dedicated security key associated with a higher-level protocol.

11. A device, comprising:
one or more components configured to:
generate a control plane message including:
a control indication field providing an indication that the control plane message is a control plane message, wherein the control indication field carries a value associated with whether or not the control plane message is a control plane message such that the value distinguishes the control plane message from non-control plane messages based on the indication that the control plane message is a control plane message, and wherein the non-control plane messages include data frames and protocol frames,
an indication that the control plane message is associated with security,
an indication of a security key to be associated with a secure zone (SZ) of an in-vehicle communication network, and
an indication of a freshness value; and
transmit the control plane message in association with indicating that a network node is to perform a cryptographic operation for a data plane message associated with the SZ using the security key.

12. The device of claim 11, wherein the indication of the security key includes a key identifier corresponding to the security key.

13. The device of claim 11, wherein the indication of the security key includes information associated with generating the security key.

14. The device of claim 11, wherein the indication of the security key includes the security key.

15. The device of claim 11, wherein the control plane message further includes control data.

16. The device of claim 11, wherein the control plane message further includes a sequence number for a secure channel (SC) associated with the security key.

17. The device of claim 11, wherein the control plane message is a secure message, the secure message being secured based on a dedicated freshness value and a dedicated security key associated with a higher-level protocol.

18. The device of claim 11, wherein the control plane message indicates to the network node to perform the cryptographic operation for the data plane message associated with the SZ of the in-vehicle communication network and indicates which security key is to be associated with the SZ for use for the cryptographic operation.

19. The device of claim 18, wherein the control plane message includes a security key indication field providing the indication of the security key to be associated with the SZ of the in-vehicle communication network.

20. A method, comprising:
receiving, by a network node, a control plane message including:
a control indication field providing an indication that the control plane message is a control plane message, wherein the control indication field carries a value associated with whether or not the control plane message is a control plane message,
an indication that the control plane message is associated with security,
an indication of a security key to be associated with a secure zone (SZ) of an in-vehicle communication network, and
an indication of a freshness value;
distinguishing the control plane message from non-control plane messages based on the indication that the control plane message is a control plane message, wherein the non-control plane messages include data frames and protocol frames; and
based on processing the control plane message, performing, by the network node and using the security key, a cryptographic operation for a data plane message associated with the SZ.

21. The method of claim 20, wherein the indication of the security key includes a key identifier corresponding to the security key.

22. The method of claim 20, wherein the indication of the security key includes information associated with generating the security key.

23. A network node, comprising:
one or more components configured to:
receive a control plane message indicating that the network node is to perform a cryptographic operation for a data plane message associated with a secure zone (SZ) of an in-vehicle communication network and indicating which security key is to be associated with the SZ for use for the cryptographic operation, the control plane message further including:
- a control indication field providing an indication that the control plane message is a control plane message, wherein the control indication field carries a value associated with whether or not the control plane message is a control plane message,
- a security key indication field providing an indication of the security key to be associated with the SZ, and
- an indication of a freshness value;

distinguish the control plane message from data plane messages based on the indication that the control plane message is a control plane message; and based on processing the control plane message, perform the cryptographic operation for the data plane message associated with the SZ using the security key.

24. An in-vehicle communication network, comprising:
a first network node; and
a control plane message transmitter configured to generate a first control plane message indicating that the first network node is to perform a first cryptographic operation for a data plane message associated with a secure zone (SZ) of the in-vehicle communication network and indicating which security key is to be associated with the SZ for use for the first cryptographic operation, wherein the first control plane message includes:
- a first control indication field providing an indication that the first control plane message is a control plane message, wherein the first control indication field carries a value associated with whether or not the first control plane message is a control plane message,
- a first security key indication field providing an indication of the security key to be associated with the SZ, and
- a first indication of a freshness value, wherein the first network node is configured to:
distinguish the first control plane message from non-control plane messages based on the indication that the first control plane message is a control plane message, obtain the security key based on the indication of the security key to be associated with the SZ, and based on processing the first control plane message, perform the first cryptographic operation for the data plane message associated with the SZ using the security key.

25. The in-vehicle communication network of claim 24, further comprising:
a second network node,
wherein the control plane message transmitter is configured to generate a second control plane message indicating that the second network node is to perform a second cryptographic operation for the data plane message associated with the SZ and indicating which security key is to be associated with the SZ for use for the second cryptographic operation, wherein the second control plane message includes:
- a second control indication field providing an indication that the second control plane message is a control plane message, wherein the second control indication field carries a value associated with whether or not the second control plane message is a control plane message,
- a second security key indication field providing an indication of the security key to be associated with the SZ, and
- a second indication of a freshness value, wherein the second network node is configured to:
distinguish the second control plane message from non-control plane messages based on the indication that the second control plane message is a control plane message, obtain the security key based on the indication of the security key to be associated with the SZ, and based on processing the second control plane message, perform the second cryptographic operation for the data plane message associated with the SZ using the security key.

* * * * *